United States Patent
Agiwal et al.

(10) Patent No.: US 8,804,614 B2
(45) Date of Patent: Aug. 12, 2014

(54) METHOD AND SYSTEM FOR MANAGING CONNECTION PAYLOAD INFORMATION IN MEDIUM ACCESS CONTROL PROTOCOL DATA UNIT

(75) Inventors: Anil Agiwal, Bangalore (IN); Sung-Jin Lee, Seoul (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 12/708,717

(22) Filed: Feb. 19, 2010

(65) Prior Publication Data
US 2010/0214986 A1  Aug. 26, 2010

(30) Foreign Application Priority Data

Feb. 20, 2009  (IN) .............................. 371/CHE/2009
Feb. 18, 2010  (IN) .............................. 371/CHE/2009

(51) Int. Cl.
*H04W 4/00*  (2009.01)
*H04W 80/04*  (2009.01)
*H04W 80/06*  (2009.01)
*H04W 28/06*  (2009.01)

(52) U.S. Cl.
CPC .............. *H04W 80/04* (2013.01); *H04W 80/06* (2013.01); *H04W 28/06* (2013.01)
USPC ............................ 370/328; 370/338; 370/469

(58) Field of Classification Search
None
See application file for complete search history.

(56) References Cited

U.S. PATENT DOCUMENTS

| | | | |
|---|---|---|---|
| 7,400,649 B2 | 7/2008 | Yi et al. | |
| 8,175,015 B1 * | 5/2012 | Chowdhuri et al. | 370/300 |
| 2006/0007886 A1 | 1/2006 | Lee et al. | |
| 2007/0297451 A1 | 12/2007 | Kim et al. | |
| 2008/0212513 A1 * | 9/2008 | Tao et al. | 370/315 |
| 2009/0069024 A1 * | 3/2009 | Lee et al. | 455/450 |
| 2009/0220085 A1 * | 9/2009 | Tao et al. | 380/270 |
| 2009/0310533 A1 * | 12/2009 | Zheng et al. | 370/328 |
| 2011/0010610 A1 * | 1/2011 | Boariu et al. | 714/807 |

FOREIGN PATENT DOCUMENTS

| | | |
|---|---|---|
| EP | 2 378 678 A2 | 10/2011 |
| KR | 10-0617818 B1 | 8/2006 |
| WO | 2004/042952 A1 | 5/2004 |

* cited by examiner

*Primary Examiner* — Bob Phunkulh
(74) *Attorney, Agent, or Firm* — Jefferson IP Law, LLP

(57) ABSTRACT

A method and system for encoding connection payload information of a plurality of connection payloads in a Medium Access Control (MAC) Protocol Data Unit (PDU) are provided. The method includes encoding connection payload information of a first connection payload from the plurality of connection payloads in a first header of the MAC PDU. The method also includes encoding connection payload information of each of a second set of connection payloads from the plurality of connection payloads in a second header of the MAC PDU, wherein the second set of connection payloads includes the plurality of connection payloads excluding the first connection payload. Further, the method sends the MAC PDU with encoded information. Thereafter, the method also includes a procedure to decode connection payload information of a plurality of connection payloads from a Medium Access Control (MAC) Protocol Data Unit (PDU).

35 Claims, 12 Drawing Sheets

METHOD AND SYSTEM FOR MANAGING CONNECTION PAYLOAD INFORMATION IN MEDIUM ACCESS CONTROL PROTOCOL DATA UNIT

PRIORITY

This application claims the benefit under 35 U.S.C. §119(a) of a provisional Indian patent application filed on Feb. 20, 2009 in the Indian Intellectual Property Office and assigned Serial No. 371/CHE/2009, and the associated complete Indian patent application filed on Feb. 18, 2010 in the Indian Intellectual Property Office and assigned Serial No. 371/CHE/2009, the entire disclosures of both of which are hereby incorporated by reference.

BACKGROUND OF THE INVENTION

1. Field of the Invention

The present invention relates to wireless communication system protocols. More particularly the present invention relates to encoding and decoding connection payload information in a Medium Access Control (MAC) Protocol Data Unit (PDU).

2. Description of the Related Art

Broadband wireless networks are based on various communication standards, for example, the Institute of Electrical and Electronics Engineers (IEEE) 802.16e based Worldwide Interoperability for Microwave Access (WiMAX) standard, and its evolution to IEEE 802.16m, provides various types of services such as voice, packet data exchange, and the like. In such a network, user data is exchanged between a subscriber station and a base station by establishing a connection. Multiple connections exist between the subscriber station and the base station to carry the user data belonging to multiple applications. The user data, in the form of connection payload, goes through various layers of protocol architecture of a communication system.

The IEEE 802.16m communication standard is associated with a protocol architecture that includes Physical (PHY) and Medium Access Control (MAC) layer specifications. The MAC layer comprises three sub-layers which are the specific Convergence Sub-layer (CS), the MAC Common Part Sub-layer (MAC CPS), and the security sub-layer. The CS provides transformation and/or mapping of external network data, received through the CS Service Access Point (SAP), into MAC Service Data Units (SDUs) received by the MAC CPS through the MAC SAP. This includes classifying external network SDUs and associating the external network SDUs to an appropriate MAC connection. It may also include other functions such as Payload Header Suppression (PHS).

The MAC CPS receives data from the various CSs, through the MAC SAP, classified to particular MAC connections. Data is transferred between the MAC CPS and the PHY layer via the PHY SAP. The MAC CPS also contains a separate security sub-layer that provides authentication, secure key exchange, and encryption. The MAC CPS forms an IEEE 802.16m based MAC PDU. The MAC PDU format includes a Generic MAC Header (GMH), an Extended Header (EH), and payload. Each connection payload includes one or more MAC SDUs or MAC SDU fragments received from the CS layer for the particular connection.

Further, the GMH format (based on the IEEE 802.16m standard) includes a Flow Identifier (Flow ID) field, an Extended Header (EH) field, and a Length field. A connection is identified by the Flow ID field. The EH field indicates whether an extended header is present in the MAC PDU or not. Further, the Length field gives information about the MAC PDU payload. The EH field includes a subfield to identify the type of specific contents. The EH field contains a type field and a body contents field. The type field indicates the type of extended header and the body contents field indicates the type-dependent contents.

The MAC PDU format includes a fixed size GMH, an optional EH, and payload. Thus, during communication each application will be associated with one connection. Hence, the connection information will be stored in the MAC PDU. As each connection is associated with a Flow ID, the Flow ID will be stored in the GMH and in-band signaling information will be accommodated in the EH. Further, the payload information will be stored in a payload field.

Currently, the MAC PDU is capable of accommodating information associated with one connection at a time. However, there may be a case that information associated with more than one connection needs to be sent using the same MAC PDU format to increase the efficiency of the communication and for enabling backward compatibility of the communication standards.

Hence there exists a need to manage multiple connection information in the MAC PDU.

SUMMARY OF THE INVENTION

An aspect of the present invention is to address at least the above-mentioned problems and/or disadvantages and to provide at least the advantages described below. Accordingly, an aspect of the present invention is to provide an apparatus and method for managing multiple connection information in a Medium Access Control (MAC) Protocol Data Unit (PDU).

In accordance with an aspect of the present invention, a method for encoding connection payload information of a plurality of connection payloads in a Medium Access Control (MAC) Protocol Data Unit (PDU) is provided. The method includes encoding connection payload information of a first connection payload from the plurality of connection payloads in a first header of the MAC PDU, encoding connection payload information of each of a second set of connection payloads from the plurality of connection payloads in a second header of the MAC PDU, wherein the second set of connection payloads includes the plurality of connection payloads excluding the first connection payload, and sending the MAC PDU with encoded information.

In accordance with another aspect of the present invention, a method for decoding connection payload information of a plurality of connection payloads in a Medium Access Control (MAC) Protocol Data Unit (PDU) is provided. The method includes receiving the MAC PDU with encoded information of a plurality of connection payloads, decoding connection payload information of a first connection payload from the plurality of connection payloads from a first header of the MAC PDU, and decoding connection payload information of each of a second set of connection payloads from the plurality of connection payloads from a second header of the MAC PDU, wherein the second set of connection payloads includes the plurality of connection payloads excluding the first connection payload.

In accordance with yet another aspect of the present invention, a first communication device is provided. The device includes a processor and a transceiver. The processor encodes connection payload information of a first connection payload from a plurality of connection payloads in a first header of a MAC PDU. Further, the processor encodes connection payload information of each of a second set of connection payloads from the plurality of connection payloads in a second header of the MAC PDU, wherein the second set of connection payloads includes the plurality of connection payloads excluding the first connection payload. The transceiver sends the MAC PDU with encoded information.

In accordance with still another aspect of the present invention, a second communication device is provided. The second communication device includes a transceiver and a processor. The transceiver receives a MAC PDU with encoded information of a plurality of connection payloads. The processor decodes connection payload information of a first connection payload from the plurality of connection payloads from a first header of the MAC PDU. The processor decodes connection payload information of each of a second set of connection payloads from the plurality of connection payloads in a second header of the MAC PDU, wherein the second set of connection payloads includes the plurality of connection payloads excluding the first connection payload.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Figure 1:
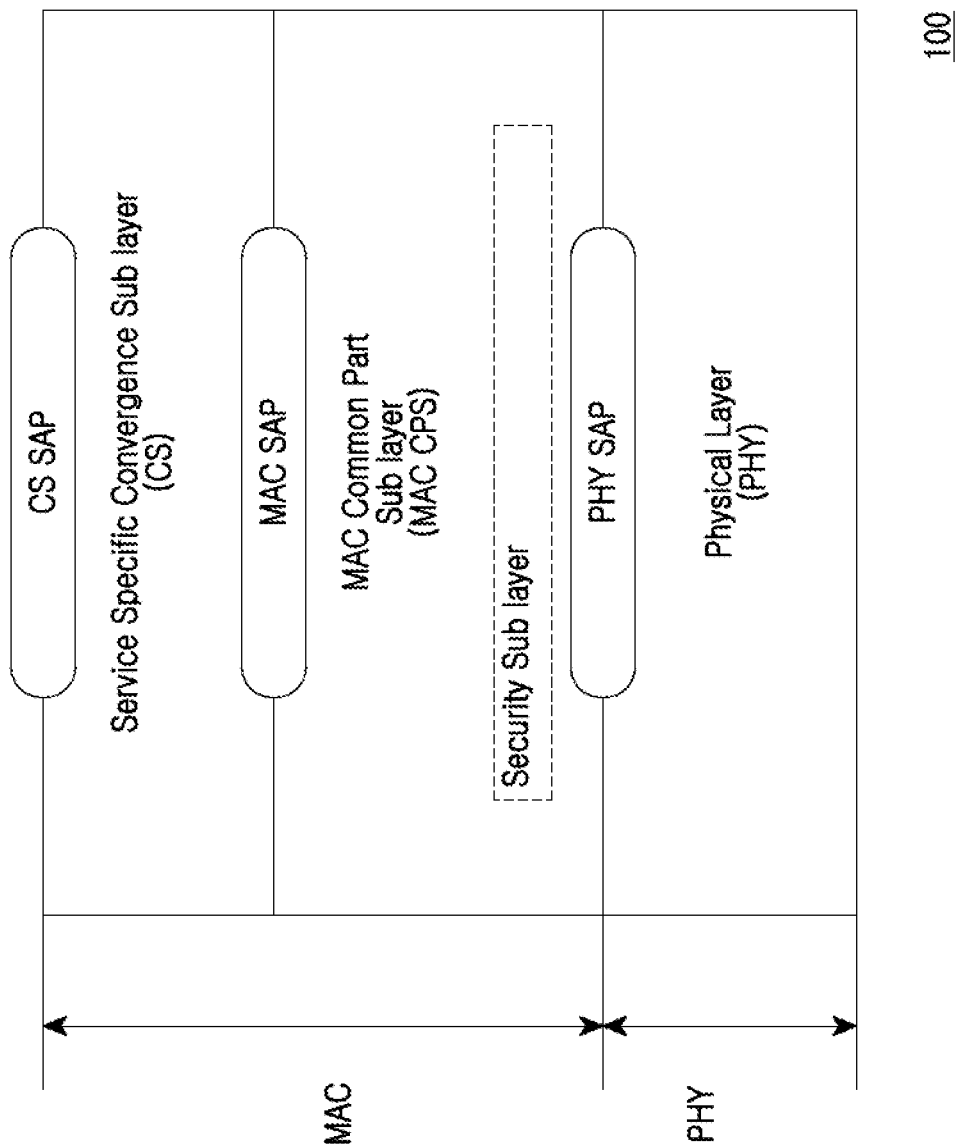
FIG. 1 illustrates an Institute of Electrical and Electronics Engineers (IEEE) 802.16m protocol architecture, in accordance with an exemplary embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates an Institute of Electrical and Electronics Engineers (IEEE) 802.16m protocol architecture, in accordance with an exemplary embodiment of the present invention.

Referring to FIG. 1, the IEEE 802.16m protocol architecture 100 defines the Physical (PHY) layer and Medium Access Control (MAC) layer specifications. The MAC layer includes three sub-layers. The three sub-layers include a service specific Convergence Sub-layer (CS), a MAC Common Part Sub-layer (MAC CPS) and a security sub-layer.

The CS provides transformation or mapping of external network data, received through the CS Service Access Point (SAP), into MAC Service Data Units (SDUs) received by the MAC CPS through the MAC SAP. This includes classifying external network SDUs and associating external network SDUs with the proper MAC connection. This also includes other functions such as Payload Header Suppression (PHS).

The MAC CPS receives data from the various CSs, through the MAC SAP, associated with specific types of MAC connections. Data is transferred between the MAC CPS and the PHY layer via the PHY SAP. The MAC CPS also contains a separate security sub-layer providing authentication, secure key exchange, and encryption. In the IEEE 802.16m protocol architecture 100, multiple connections Protocol Data Units (PDUs) can be multiplexed in a MAC PDU used in broadband wireless networks. In an exemplary embodiment, the multiple connections information is encoded in the MAC PDU. In another exemplary embodiment, the multiple connections information is encoded in the Extended Header (EH) field of the MAC PDU. In yet another exemplary embodiment, the multiple connections information is encoded in a Multiplexing EH (MEH) field.

Figure 2:
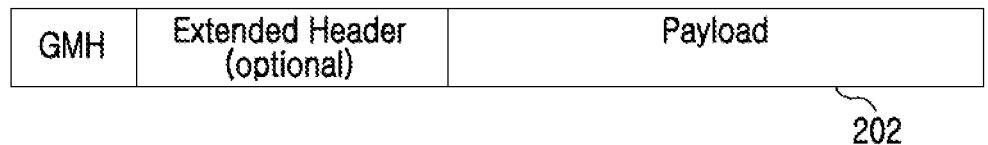
FIG. 2 illustrates an IEEE 802.16m Media Access Control (MAC) Protocol Data Unit (PDU) format, in accordance with the prior art.
Figure 2:
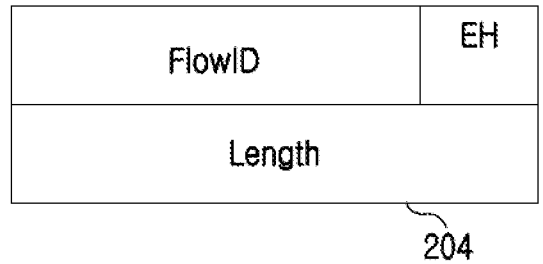
Figure 2:
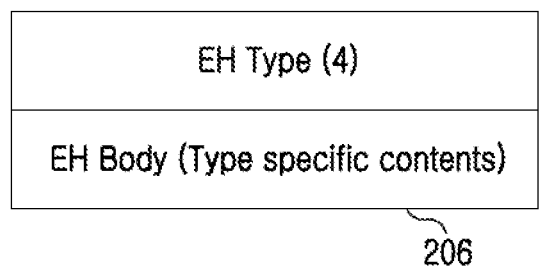

FIG. 2 illustrates an IEEE 802.16m MAC PDU format, in accordance with the prior art.

Referring to FIG. 2, the MAC PDU is capable of handling connection payload information of one connection. The MAC common part sub-layer forms MAC PDUs. A generic IEEE 802.16m based MAC PDU format is depicted in a MAC PDU format 202. The MAC PDU format 202 includes a Generic MAC Header (GMH), an EH, and payload. The payload includes payloads from one or more connections. Each connection payload includes one or more MAC SDU or MAC SDU fragment received from a CS layer for that connection. An IEEE 802.16m based GMH format is shown as a GMH format 204 in FIG. 2.

The GMH format 204 includes Flow Identifier (Flow ID) field with which a connection is identified. The GMH format 204 also includes an EH field to indicate whether an extended header is present in the MAC PDU or not. The GMH format 204 further includes a Length field to identify payload length of the MAC PDU. An EH format is shown as EH format 206 in FIG. 2. The EH format 206 contains an EH Type field to indicate the type of extended header, and an EH body field for type specific contents. The MAC PDU format contains a fixed size GMH. As the current GMH is fixed in size, multiple connection information cannot be incorporated in the GMH.

Figure 3:
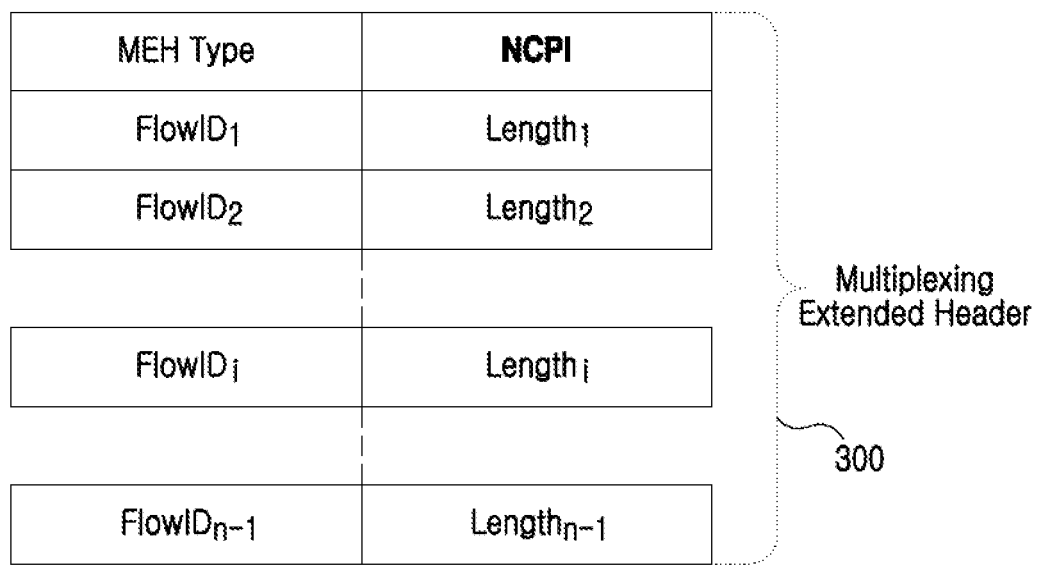
FIG. 3 illustrates a Multiplexing Extended Header (MEH) format in a MAC PDU, in accordance with an exemplary embodiment of the present invention.

FIG. 3 illustrates an MEH format in a MAC PDU, in accordance with an exemplary embodiment of the present invention.

Referring to FIG. 3, multiple connection information in the MAC PDU is encoded using a GMH and an EH. In an exemplary embodiment, the EH is an MEH 300. The MEH format includes an MEH Type field, a Number of Connection Payload Information (NCPI) field, a plurality of Flow IDentity (FlowID) fields, and a plurality of Length fields corresponding to the plurality of FlowID fields. The MEH Type field is used to identify the type of MEH present. In an exemplary embodiment, the type field distinguishes the MEH from other types of EHs in the MAC PDU.

The information present in the NCPI field indicates the amount of connection payload information present in the MEH 300. Further, the Length field associated with the corresponding FlowID field indicates the payload length information of the connection associated with the FlowID. The FlowID field in the GMH of the MAC PDU (not shown) identifies the first connection corresponding to the first connection payload in the MAC PDU. Thus, for example, the 'i'th FlowID field (where 'i' is any number associated with a connection) in the MEH 300 identifies the connection corresponding to the 'i+1'th connection payload in the MAC PDU. Similarly, the 'i'th length field in the MEH 300 identifies the length of the 'i+1'th connection payload in the MAC PDU.

The size of the Length field in the MEH 300 is same as the size of the Length field in the GMH. In an exemplary embodiment, the length of the first connection payload in the MAC PDU is identified using the length field in the GMH 300. In an exemplary embodiment, if the Length field in the GMH 300 indicates the MAC PDU length, then the length of the first connection payload is identified based on the sum of length fields in the MEH 300 and the length of all EHs and other headers present in the MAC PDU. In an exemplary embodiment, the length of the first connection payload is based on the information present in the Length field in the GMH 300.

Figure 4:
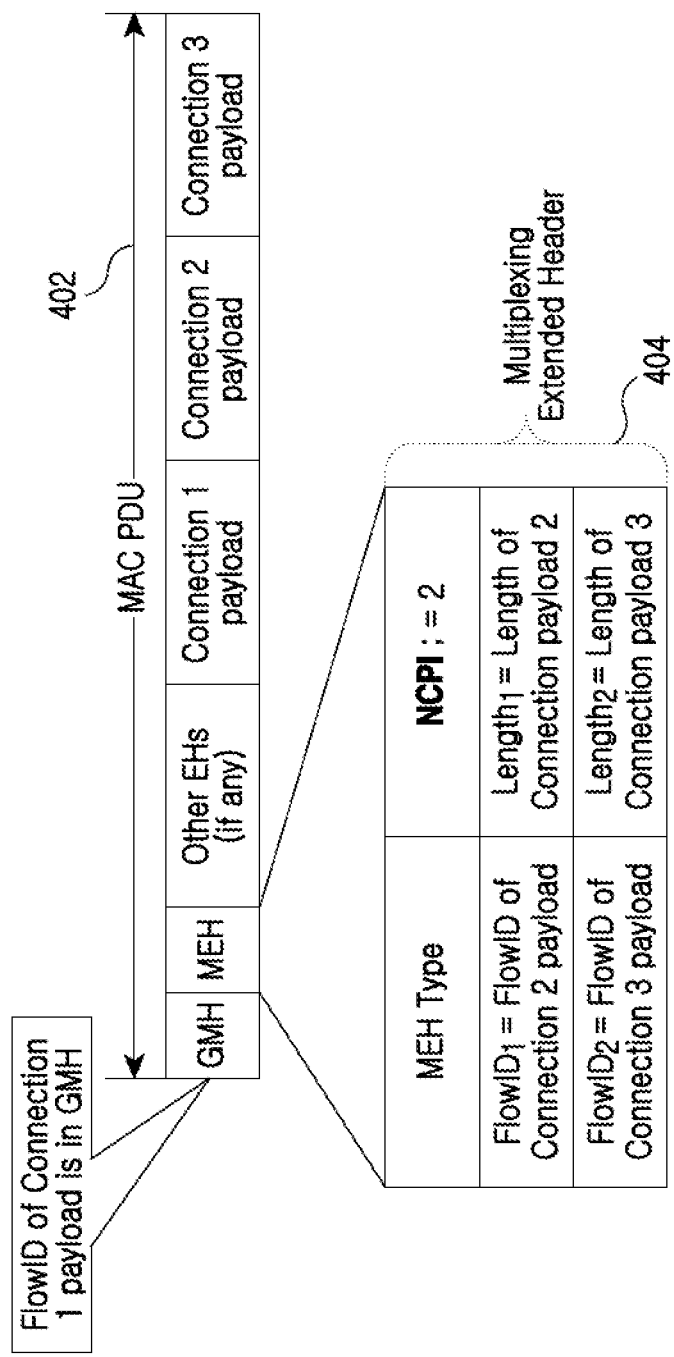
FIG. 4 illustrates multiple connection payload information encoded in a MAC PDU, in accordance with an exemplary embodiment of the present invention.

FIG. 4 illustrates multiple connection payload information encoded in a MAC PDU, in accordance with an exemplary embodiment of the present invention.

Referring to FIG. 4, the MAC PDU 402 includes a GMH, an MEH, Other EHs, and multiple connection payload fields. In an exemplary embodiment, the multiple connection payload information is encoded using the GMH and the MEH of the MAC PDU 402. The MAC PDU 402 in FIG. 4 is shown to include three connection payloads. However, it is understood that this is merely for example and not limiting.

The MEH 404 in the MAC PDU 402 is further shown to include two FlowID fields and two Length fields associated with the two FlowID fields. The first connection payload FlowID is present in the GMH. A FlowID1 field in the MEH 404 identifies connection of the second connection payload. A FlowID2 field in the MEH 404 identifies the connection of the third connection payload. Similarly, the Length1 field in the MEH 404 identifies the length of the second connection payload and the Length2 in the MEH 404 identifies the length of the third connection payload.

In an exemplary embodiment, the Length field in the GMH indicates the length of the MAC PDU 402. Thus, the first Length field in the MEH identifies the length of the first connection payload. Similarly, the second Length field in the MEH identifies the length of the second connection payload. Hence, the length of last connection payload in the MAC PDU 402 is identified based on the length of all extended headers and other headers present in the MAC PDU 402 and the sum of the length fields in the MEH field. In an exemplary embodiment, the length of the last connection payload in the MAC PDU 402 is identified by subtracting the length of all EHs and other headers present in the MAC PDU 402 from the sum of the Length fields in the MEH field.

Figure 5:
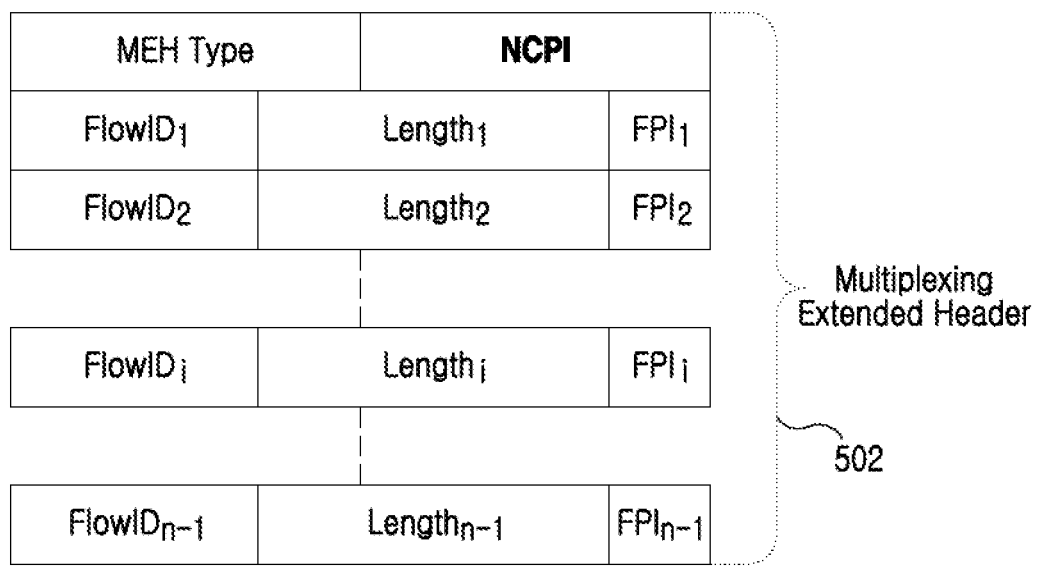
FIG. 5 illustrates an MEH format in a MAC PDU, in accordance with an exemplary embodiment of the present invention.

FIG. 5 illustrates an MEH format in a MAC PDU, in accordance with an exemplary embodiment of the present invention.

Referring to FIG. 5, the MEH format includes fragmentation and packing information. An exemplary MEH with fragmentation and packing information is shown in section 502. In an exemplary embodiment, the Fragmentation and Packing Indicator (FPI) indicates whether fragmentation and packing information corresponding to a connection payload identified by a corresponding FlowID field is present in the MAC PDU.

In an exemplary embodiment, the fragmentation and packing information may be present in a sub-header or extended header in the MAC PDU. The presence or absence of the fragmentation and packing information for the first connection payload is determined by the FPIs of other connection payloads in the MAC PDU and the number of fragmentation and packing information present in the MAC PDU. For example, a second FPI field in the MEH indicates the presence or absence of the fragmentation and packing information of the third connection payload in the MAC PDU.

In an exemplary embodiment, the presence of the fragmentation and packing information for the first connection payload in the MAC PDU is identified based on the number of fragmentation and packing information present in the MAC PDU and the number of FPIs in the MEH that are set to '1'. For example, the fragmentation and packing information for the first connection payload in the MAC PDU is present if the difference between the number of fragmentation and packing information present in the MAC PDU and the number of FPIs in the MEH that are set to '1' is equal to one. In an exemplary embodiment, the fragmentation and packing information for the first connection payload is not present in the MAC PDU if the difference between the number of fragmentation and packing information present in the MAC PDU and the number of FPIs in the MEH that are set to '1' is equal to zero (0).

For example, if there are 'p' number of FPIs in the MEH that are set to '1' and the fragmentation and packing information for the first connection payload is present in the MAC PDU, then there are 'p+1' fragmentation packing information in the MAC PDU. However, if there are 'p' number of FPIs in the MEH that are set to '1' and the fragmentation and packing information for the first connection payload is not present in the MAC PDU, then there are 'p' number of fragmentation packing information in MAC PDU.

Thus, the 'i'th FPI field (FPIith field, where 'i' is any number associated with a connection) in the MEH is set to '1' if the fragmentation and packing information of the 'i+1'th connection payload is present in the MAC PDU, otherwise it is set to '0'. Hence, when the MAC PDU is received, the presence or absence of fragmentation and packing information for a connection payload is identified based on the number of fragmentation and packing information present in the MAC PDU.

After receiving the MAC PDU, a set of the fragmentation and packing information is created. Thereafter, another set is created which includes connection payloads for which fragmentation and packing information is present based on the FPI fields in the MEH. There is one to one mapping of elements between the two sets wherein the 'i'th element in one set corresponds to the 'i'th element in another set.

Figure 6A:
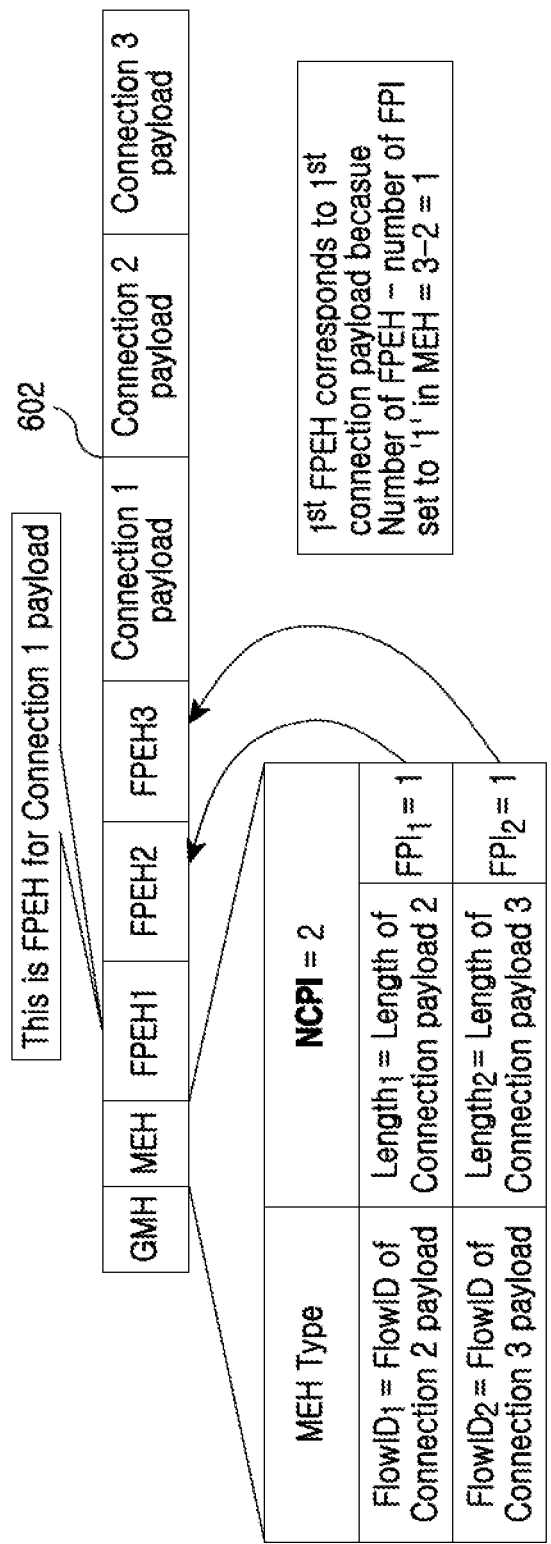
FIG. 6A and FIG. 6D illustrate methods of decoding connection payload information from a MAC PDU, in accordance with an exemplary embodiment of the present invention.
Figure 6B:
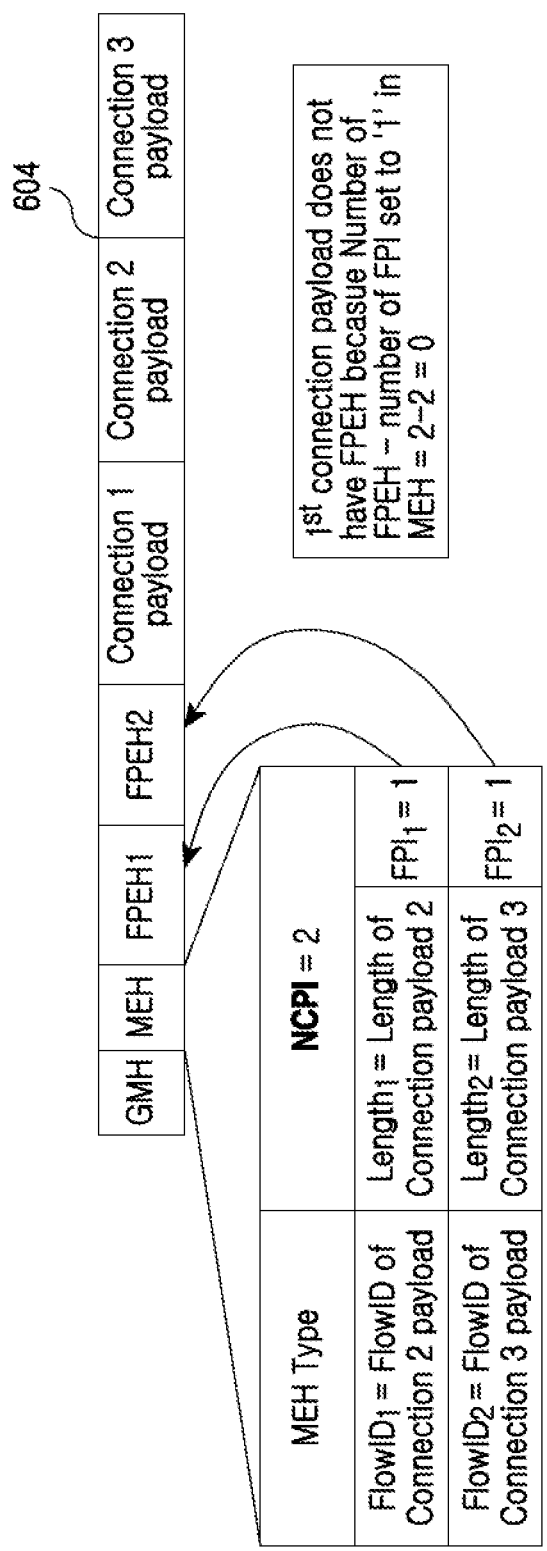
Figure 6C:
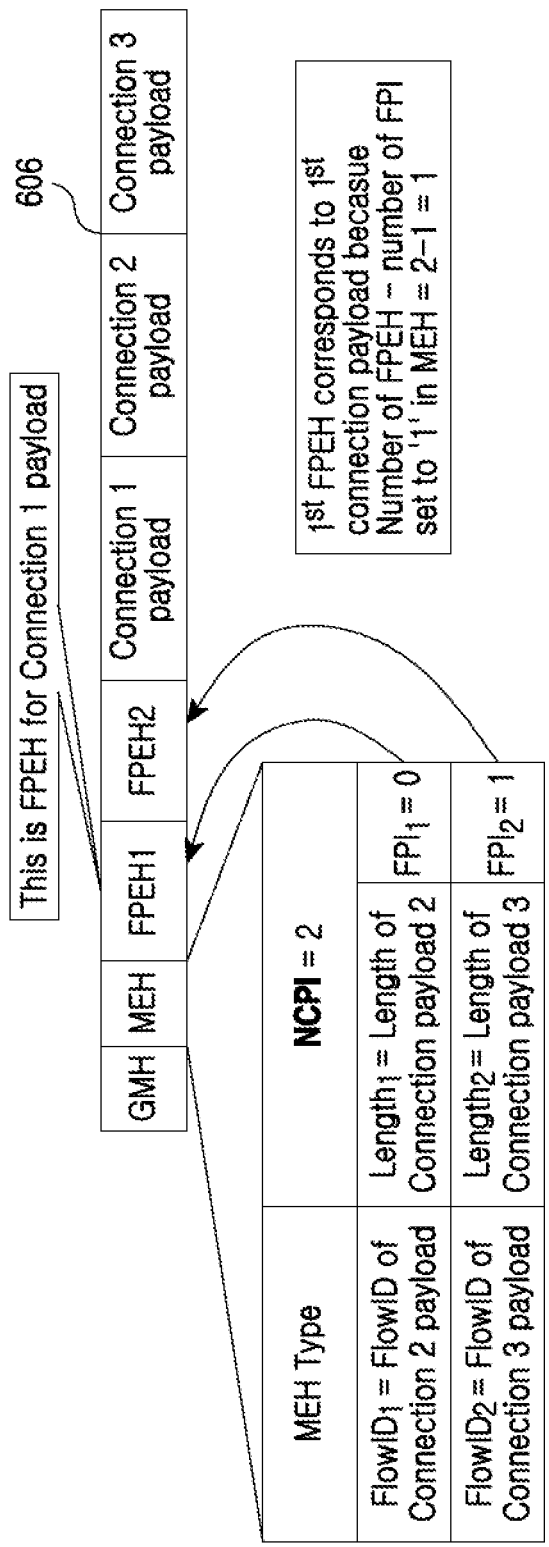
Figure 6D:
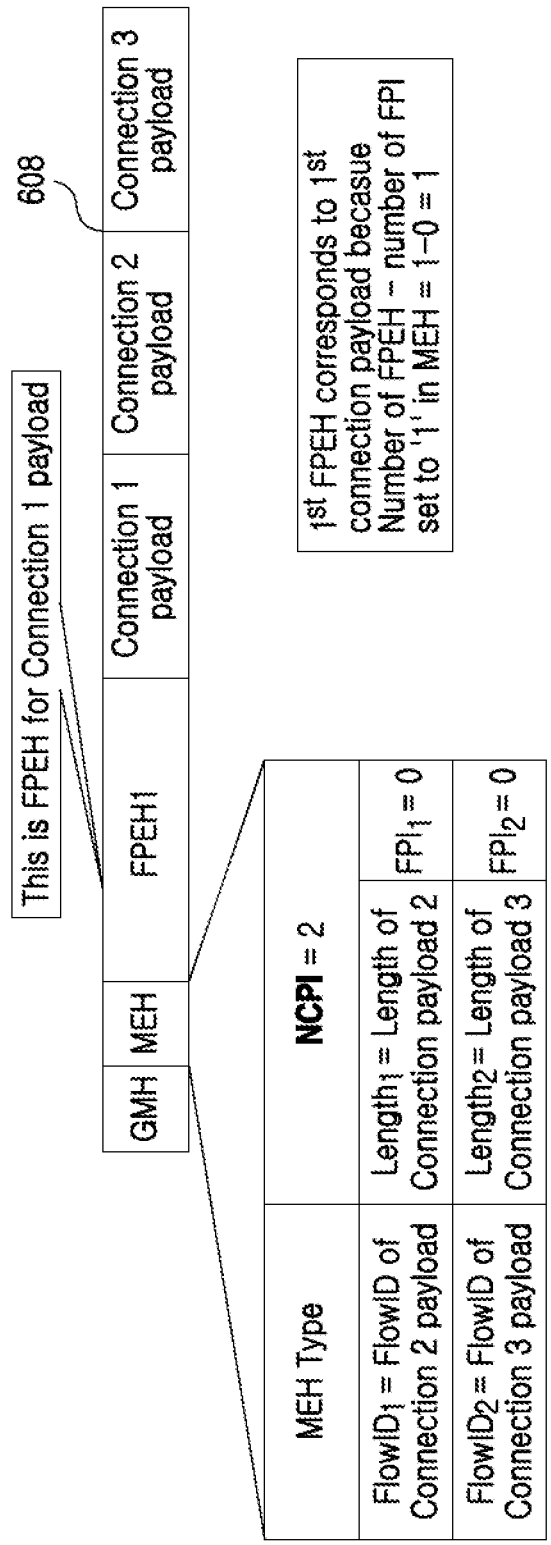

FIG. 6A and FIG. 6D illustrate methods of decoding connection payload information from a MAC PDU, in accordance with an exemplary embodiment of the present invention.

In an exemplary embodiment, FIG. 6A and FIG. 6D illustrate use of an FPI field in a MAC PDU. For illustration and convenience of explanation, FIG. 6A and FIG. 6D show three connection payloads multiplexed in the MAC PDU.

Referring to FIG. 6A, in the MAC PDU 602 there are three Fragmentation and Packing Extended Header (FPEH) fields and the MEH includes two FPIs set to '1'. The second FPI field is set to '1' in the MEH which indicates that the FPEH is present for Connection payload 3. The first FPI field is also set to '1' in the MEH. This indicates that the FPEH is present for connection payload 2.

The FPEH1 is also present for Connection payload 1 and indicates that a difference between the number of fragmentation and packing information present in the MAC PDU 602 and the number of FPI fields in MEH that are set to '1' is one (e.g., '3'−'2'='1'). The FPEH set in the MAC PDU 602 includes FPEH1, FPEH2, and FPEH3. The connection payload associated with the FPEH set includes Connection payload 1, Connection payload 2, and Connection payload 3. Hence, there is one to one mapping of elements between the two sets.

In the MAC PDU 604 shown in FIG. 6B, there are two FPEH fields present in the MAC PDU 604 and the MEH includes two FPI fields that are set to '1'. The second FPI field in the MEH is set to '1' which indicates that FPEH is present for Connection payload 3. Similarly, the first FPI field in the MEH is set to '1' which indicates that FPEH is present for Connection payload 2. However, the FPEH1 is not present for Connection payload 1 as the difference between the number of fragmentation and packing information present in the MAC PDU 604 and the number of FPI fields present in the MEH that are set to '1' is zero (e.g., 2−2=0).

In the MAC PDU 604, the FPEH set includes FPEH1 and FPEH2 and the connection payload associated with the FPEH set includes Connection payload 2, and Connection payload 3. There is one to one mapping of elements between the two sets. That is, the 'i'th element in one set corresponds to the 'i'th element in another set.

Referring to FIG. 6C, in the MAC PDU 606 there are two FPEHs present in the MAC PDU 606 and the MEH includes one FPI field that is set to '1' and another FPI field that is set to '0'. The 2nd FPI field that set to '1' in the MEH indicates that an FPEH is present for Connection payload 3. The first FPI field that is set to '0' in the MEH indicates that an FPEH is not present for Connection payload 2. The FPEH1 is present for Connection payload 1, indicating that the difference between the number of fragmentation and packing information present in the MAC PDU 606 and the number of FPI fields in the MEH that are set to '1' is one (e.g., '2'−'1'='1'). In the MAC PDU 606, the FPEH set includes FPEH1 and FPEH2 and the connection payload associated with the FPEH set includes Connection payload 1 and Connection payload 3.

In the MAC PDU 608 shown in FIG. 6D, there is one FPEH field present in the MAC PDU 608 and the MEH includes two FPI fields that are set to '0'. The first FPI field set to '0' in the MEH indicates that an FPEH is not present for Connection payload 2. Similarly, the second FPI field set to '0' in the MEH indicates that an FPEH is not present for Connection payload 3 also.

However, the FPEH1 is present for Connection payload 1, indicating that the difference between the number of fragmentation and packing information present in the MAC PDU 608 and the number of FPI fields in MEH that are set to '1' is one. This is because the number of fragmentation and packing information present in the MAC PDU 608 is '1' and the number of FPI fields in the MEH that are set to '1' is zero, hence the difference is 1 (e.g., '1'−'0'='1'). In the MAC PDU 608, the 'FPEH' set includes FPEH1 and the connection payload associated with the FPEH set includes Connection payload 1.

In an exemplary embodiment, the MEH may include a bit mask field that may include a predefined number of bits associated with a plurality of FPIs instead of an FPI field associated with each FlowID field. In an exemplary embodiment, the bit mask field may be present after the NCPI field or after the flow information blocks. The predefined number of bits in the bit mask field is equal to the number of flow information blocks in the MEH plus one.

Each bit in the bit mask indicates whether a fragmentation and packing information for a particular connection payload is present in the MAC PDU. In an exemplary embodiment, the most significant bit in the bit mask field may correspond to the first connection payload and the least significant bit may correspond to the last connection payload in the MAC PDU.

Though a FlowID field is used to identify the connection, an FPI field is used to identify fragmentation and packing information, and a connection payload field is used for connection payload information, it does not restrict the invention to the FPI field and the connection payload field. Hence, it should be apparent that the person having ordinary skill in the art may use any other field of the MAC PDU to identify the said information.

Figure 7:
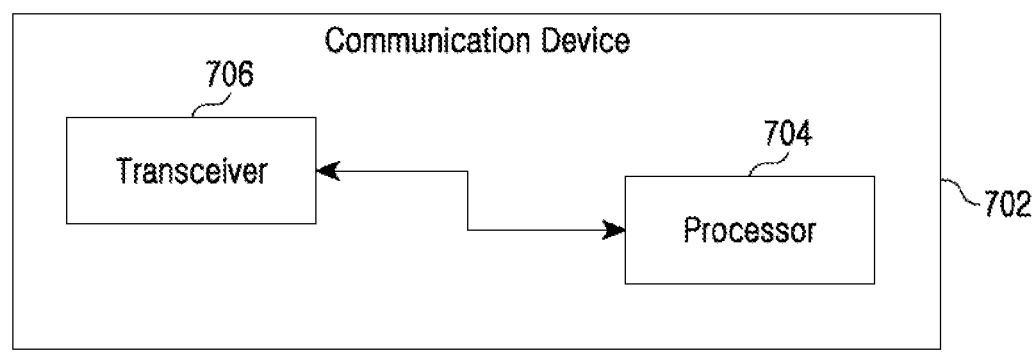
FIG. 7 illustrates a communication device, in accordance with an exemplary embodiment of the present invention.

FIG. 7 illustrates a communication device, in accordance with an exemplary embodiment of the present invention.

Referring to FIG. 7, the communication device 702 includes a processor 704 and a transceiver 706. In an exemplary embodiment, the processor 704 encodes a plurality of connection payload information in a MAC PDU before the MAC PDU is transmitted from the communication device 702.

In an exemplary embodiment, the processor 704 encodes connection payload information of a first connection payload from a plurality of connection payloads in a first header of a MAC PDU. The processor 704 also encodes connection payload information of each of a second set of connection payloads from the plurality of connection payloads in a second header of the MAC PDU. In an exemplary embodiment, the second set of connection payloads includes the plurality of connection payloads excluding the first connection payload.

The transceiver 706 in the communication device 702 sends the MAC PDU with encoded information. In an exemplary embodiment, the transceiver 706 also receives the encoded MAC PDU. In an exemplary embodiment, the processor 704 decodes connection payload information of a plurality of connections from the MAC PDU when the MAC PDU including encoded information is received by the transceiver 706 in the communication device 702.

Figure 8:
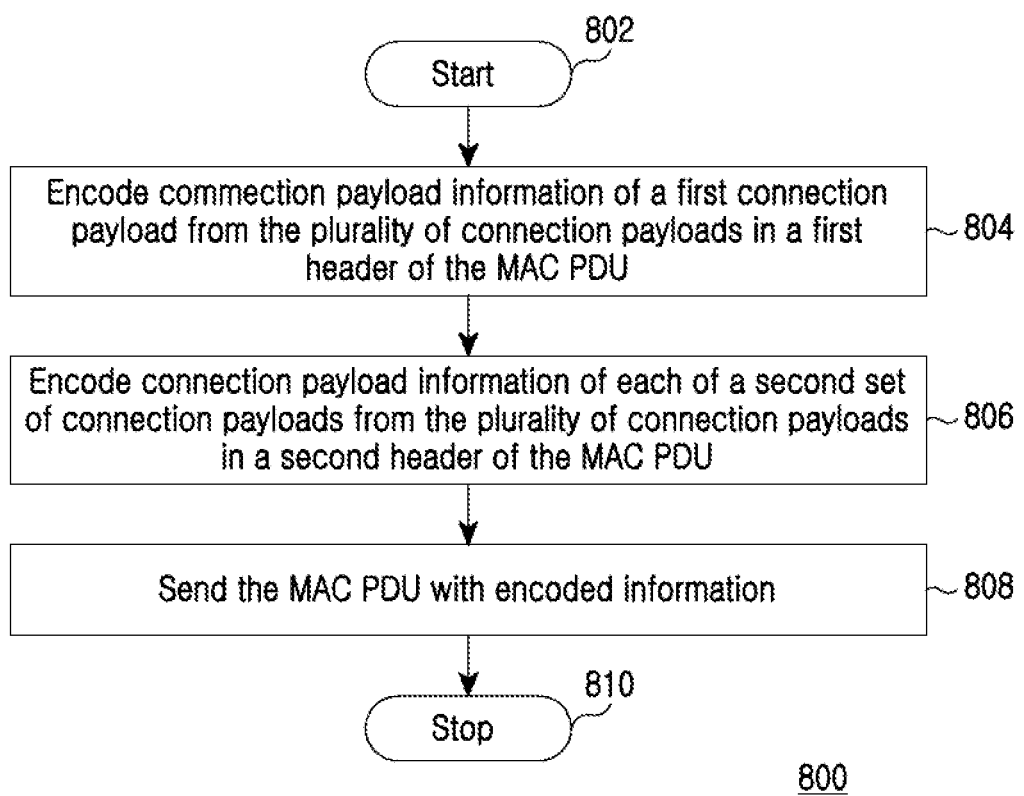
FIG. 8 illustrates a flowchart depicting a method for encoding connection payload information of a plurality of connection payloads in a MAC PDU, in accordance with an exemplary embodiment of the present invention.

FIG. 8 illustrates a flowchart depicting a method for encoding connection payload information of a plurality of connection payloads in a MAC PDU, in accordance with an exemplary embodiment of the present invention.

To assist in explanation of the method 800, reference will be made to figures described above (i.e., FIG. 1 to FIG. 7). However, it will be apparent to a person ordinarily skilled in the art that the present exemplary embodiment can be explained with the help of any other suitable embodiment of the present invention. The method 800 can also include more or fewer processes than those depicted in FIG. 8. Further, the order of the steps may also vary.

Referring to FIG. 8, the method 800 is initiated at step 802. At step 804, the method 800 encodes connection payload information of a first connection payload from the plurality of connection payloads in a first header of the MAC PDU. In an exemplary embodiment, the first header is a GMH of the MAC PDU. At step 806, the method 800 encodes connection payload information of each of a second set of connection payloads from the plurality of connection payloads in a second header of the MAC PDU.

In an exemplary embodiment, the second set of connection payloads includes the plurality of connection payloads excluding the first connection payload. In an exemplary embodiment, the second header is an MEH of the MAC PDU. In an exemplary embodiment, the multiplexing of connection payload information corresponding to a particular connection is explained in conjunction with FIG. 3.

In an exemplary embodiment, information associated with presence of the second header in an EH is encoded in a Type field of the EH and an EH field of the first header. Further, information associated with the number of connection payload information present in the second header is encoded in an NCPI field of the second header. The NCPI field is shown in FIG. 3.

In an exemplary embodiment, the information about connection identifiers associated with the plurality of connection payloads is encoded in a Flow ID field of the first header and a plurality of Flow ID fields of the second header. In an exemplary embodiment, connection identifier information of the first connection payload is encoded in the Flow ID field of the first header. Further, connection identifier information of each of the connection payloads from the second set of connection payloads is encoded in the plurality of Flow ID fields in the second header. In an exemplary embodiment, the length of the first connection payload is encoded in the Length field of the first header. Further, the length of each of the connection payloads from the second set of the connection payloads is encoded in the plurality of Length fields in the second header.

In an exemplary embodiment, information associated with the total length of the MAC PDU is encoded in the Length field of the first header. Further, the length of each of the connection payloads of the second set of connection payloads is encoded in the plurality of Length fields in the second header. The method encodes lengths of the plurality of connection payloads in a Length field of the first header and a plurality of Length fields in the second header. The encoding of information in the MAC PDU is also explained in conjunction with FIG. 3 and FIG. 4.

In an exemplary embodiment, the presence of fragmentation and packing information for the plurality of connection payloads is encoded in a plurality of FPI fields present in the second header, wherein the fragmentation and packing information is in the MAC PDU. In an exemplary embodiment, the presence of fragmentation and packing information for the second set of connection payloads is encoded in the plurality of FPI fields in the second header.

In an exemplary embodiment, information associated with the presence of fragmentation and packing information for the plurality of connection payloads is encoded in an FPI bit map field in the second header. In an exemplary embodiment, the fragmentation and packing information is in the MAC PDU. The encoding of fragmentation and packing information in the MAC PDU is explained in conjunction with FIG. 5 and FIG. 6. At step 808, the method 800 sends the MAC PDU with encoded information. At step 810 the method terminates.

Figure 9:
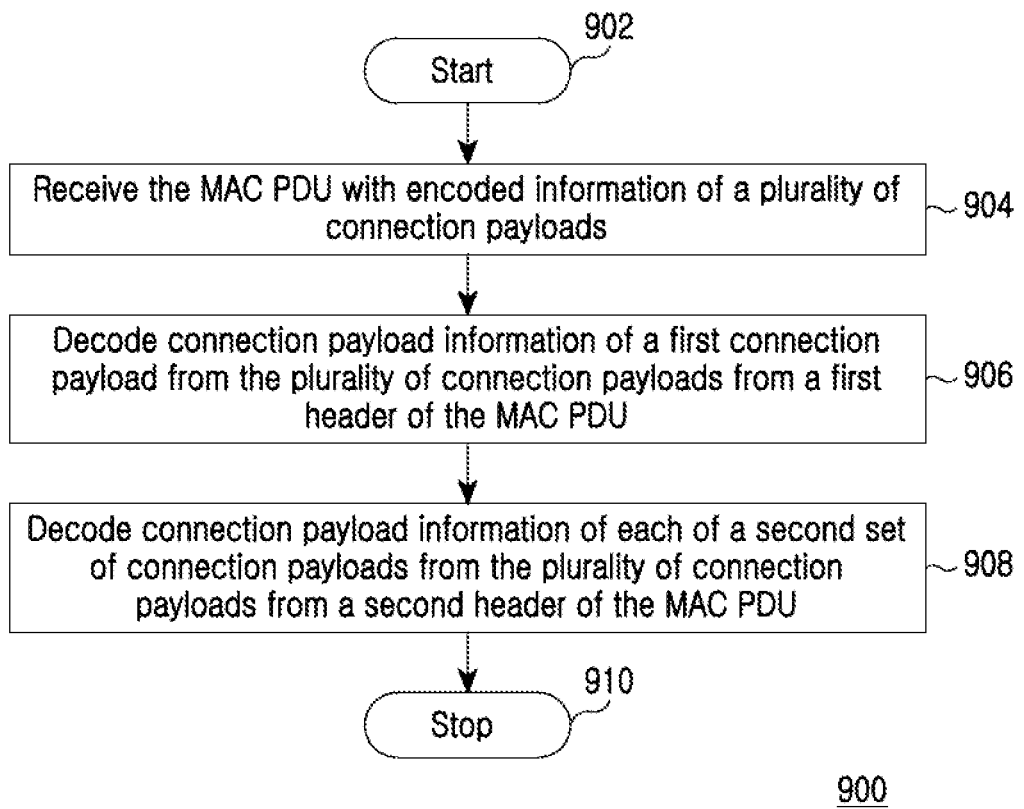
FIG. 9 illustrates a flowchart depicting a method for decoding connection payload information of a plurality of connection payloads in a MAC PDU, in accordance with an exemplary embodiment of the present invention.

FIG. 9 illustrates a flowchart depicting a method for decoding connection payload information of a plurality of connection payloads in a MAC PDU, in accordance with an exemplary embodiment of the present invention.

To assist in explanation of the method 900, reference will be made to figures described above (i.e., FIG. 1 to FIG. 7). However, it will be apparent to a person ordinarily skilled in the art that the present exemplary embodiment can be explained with the help of any other suitable embodiment of the present invention. The method 800 can also include more or fewer processes than those depicted in FIG. 9. Further, the order of the steps may also vary.

Referring to FIG. 9, the method 900 is initiated at step 902. At step 904, the method 900 receives the MAC PDU with encoded information of a plurality of connection payloads. In an exemplary embodiment, the MAC PDU is received by a transceiver. At step 906, the method decodes connection payload information of a first connection payload from the plurality of connection payloads from a first header of the MAC PDU. In an exemplary embodiment, the first header is a GMH of a MAC PDU.

At step 908, the method decodes connection payload information of each of a second set of connection payloads from the plurality of connection payloads from a second header of the MAC PDU. The second set of connection payloads includes the plurality of connection payloads excluding the first connection payload. In an exemplary embodiment, the second header is an MEH of a MAC PDU.

In an exemplary embodiment, the presence of the second header in an EH is identified based on information present in a Type field of the EH and information present in an EH field of the first header. The EH field is present in the MAC PDU. In an exemplary embodiment, the method identifies a number of connection payload information present in the second header from an NCPI field of the second header.

The method 900 identifies connection identifiers associated with the plurality of connection payloads in the MAC PDU based on information present in a Flow ID field of the first header and information present in plurality of Flow ID fields of the second header. In an exemplary embodiment, the connection identifier of the first connection payload in the MAC PDU is identified from the information present in the Flow ID field of the first header and the connection identifiers of the second set of connection payloads is identified from the plurality of connection payloads from the information present in the plurality of Flow ID fields in the second header.

In an exemplary embodiment, the length of the plurality of connection payloads in the MAC PDU is identified based on information present in a Length field of the first header and information present in a plurality of Length fields in the second header. The method 900 identifies the length of the first connection payload in the MAC PDU from the Length field of the first header. Further, the length of each of the connection payloads is identified from the second set of the connection payloads based on the information present in the plurality of Length fields in the second header.

In an exemplary embodiment, the information associated with the MAC PDU length is stored in the Length field of the first header. Thus, the method identifies the length of each of the connection payloads from the second set of connection payloads based on the information present in the plurality of Length fields in the second header. Further, the method identifies the length of the first connection payload based on a sum of values present in the plurality of Length fields in the second header, the MAC PDU length, and the length of one or more EHs present in the MAC PDU. The MAC PDU with connection payload information, length of connection payload, and Flow Identity information, is explained in conjunction with FIG. 3 and FIG. 4.

In an exemplary embodiment, the method 900 also identifies the presence of fragmentation and packing information in the MAC PDU for the plurality of connection payloads from a plurality of FPI fields present in the second header. In an exemplary embodiment, the method identifies the presence of fragmentation and packing information for the second set of connection payloads based on the information present in the plurality of FPI fields in the second header. The method identifies the presence of fragmentation and packing information in the MAC PDU for the plurality of connection payloads based on an FPI bit map field present in the second header. The MAC PDU with fragmentation and packing information is explained in conjunction with FIG. 5 and FIG. 6.

Exemplary embodiments of the present invention provide methods to encode and decode multiple connections in a MAC PDU. The exemplary methods encode multiple connection information using multiplexing techniques. The multiplexing of information associated with multiple connections reduces system overhead needed for sending information associated with each connection separately.

Exemplary methods introduce a header that is used to carry multiple connection information in the existing MAC PDU format. Hence, exemplary methods do not require changes in the current MAC PDU format to carry multiple connections. Thus, backward compatibility is maintained. Further, the header does not increase overhead when single connection payload information is encoded.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for encoding connection payload information of a plurality of connection payloads in a Medium Access Control (MAC) Protocol Data Unit (PDU), the method comprising:

encoding a first header of the MAC PDU to include connection payload information of a first connection payload from among the plurality of connection payloads;

encoding a second header of the MAC PDU to include connection payload information of each of a second plurality of connection payloads from among the plurality of connection payloads, wherein the second plurality of connection payloads is a second set of connection payloads excluding the first connection payload; and sending the MAC PDU including encoded information.

2. The method of claim 1, wherein the first header comprises a Generic MAC header (GMH) of the MAC PDU.

3. The method of claim 1, wherein the second header comprises a Multiplexing Extended Header (MEH) of the MAC PDU.

4. The method of claim 1, further comprising encoding information associated with a presence of the second header in an Extended Header (EH) in a type field of the EH and an EH field of the first header, wherein the EH is in the MAC PDU.

5. The method of claim 1, further comprising encoding information associated with a number of connection payload information present in the second header in a Number of Connection Payload Information (NCPI) field of the second header.

6. The method of claim 1, further comprising encoding information about connection identifiers associated with the plurality of connection payloads in a Flow ID field of the first header and a plurality of Flow ID fields of the second header.

7. The method of claim 6, further comprising encoding connection identifier information of the first connection payload in the Flow ID field of the first header.

8. The method of claim 6, further comprising encoding connection identifier information of each connection payload from the second set of connection payloads in the plurality of Flow ID fields in the second header.

9. The method of claim 1, further comprising encoding lengths of the plurality of connection payloads in a length field of the first header and a plurality of length fields in the second header.

10. The method of claim 9, further comprising encoding a length of the first connection payload in the length field of the first header.

11. The method of claim 10, further comprising encoding a length of each connection payload from the second set of connection payloads in a plurality of length fields in the second header.

12. The method of claim 9, further comprising encoding information associated with a MAC PDU length in the length field of the first header.

13. The method of claim 12, further comprising encoding a length of each connection payload of the second set of connection payloads in the plurality of length fields in the second header.

14. The method of claim 1, further comprising encoding information associated with a presence of fragmentation and packing information for the plurality of connection payloads in a plurality of Fragmentation and Packing Indicator (FPI) fields present in the second header, wherein the fragmentation and packing information is in the MAC PDU.

15. The method of claim 14, further comprising encoding information associated with presence of fragmentation and packing information for the second set of connection payloads in the plurality of FPIs in the second header.

16. The method of claim 1, further comprising encoding information associated with a presence of fragmentation and packing information for the plurality of connection payloads in a Fragmentation and Packing Indicator (FPI) bit map field in the second header, wherein the fragmentation and packing information is in the MAC PDU.

17. A method for decoding connection payload information of a plurality of connection payloads in a Medium Access Control (MAC) Protocol Data Unit (PDU), the method comprising:

receiving the MAC PDU including encoded information of the plurality of connection payloads;

decoding a first header of the MAC PDU that includes connection payload information of a first connection payload from among the plurality of connection payloads; and decoding a second header of the MAC PDU that includes connection payload information of each of a second plurality of connection payloads from among the plurality of connection payloads, wherein the second plurality of connection payloads is a second set of connection payloads excluding the first connection payload.

18. The method of claim 17, wherein the first header comprises a Generic MAC header (GMH) of a MAC PDU.

19. The method of claim 17, wherein the second header comprises a Multiplexing Extended Header (MEH) of a MAC PDU.

20. The method of claim 17, further comprising identifying a presence of the second header in an Extended Header (EH) based on information present in a type field of the EH and information present in EH field of the first header, wherein the EH is in the MAC PDU.

21. The method of claim 17, further comprising identifying a number of connection payload information present in the second header from a Number of Connection Payload Information (NCPI) field of the second header.

22. The method of claim 17, further comprising identifying connection identifiers associated with the plurality of connection payloads in the MAC PDU based on information present in a Flow ID field of the first header and information present in a plurality of Flow ID fields of the second header.

23. The method of claim 22, further comprising identifying a connection identifier of the first connection payload in the MAC PDU from on the information present in the Flow ID field of the first header.

24. The method of claim 22, further comprising identifying connection identifiers of the second set of connection payloads from the plurality of connection payloads from the information present in the plurality of Flow ID fields in the second header.

25. The method of claim 17, further comprising identifying a length of the plurality of connection payloads in the MAC PDU based on information present in a length field of the first header and information present in a plurality of length fields in the second header.

26. The method of claim 25, further comprising identifying a length of the first connection payload in the MAC PDU from the length field of the first header.

27. The method of claim 26, further comprising identifying a length of each connection payload from the second set of connection payloads based on the information present in a plurality of length fields in the second header.

28. The method of claim 25, further comprising storing information associated with a MAC PDU length in the length field of the first header.

29. The method of claim 28, further comprising identifying a length of each connection payload from the second set of connection payloads based on the information present in the plurality of length fields in the second header.

30. The method of claim 28, further comprising identifying a length of the first connection payload based on a sum of values present in the plurality of length fields in the second header, the MAC PDU length and the length of one or more Extended Headers (EH) present in the MAC PDU.

31. The method of claim 17, further comprising identifying a presence of fragmentation and packing information in the MAC PDU for the plurality of connection payloads from a plurality of Fragmentation and Packing Indicator (FPI) fields present in the second header.

32. The method of claim 31, further comprising identifying a presence of fragmentation and packing information for the second set of connection payloads based on the information present in the plurality of FPI fields in the second header.

33. The method of claim 17 further comprising identifying a presence of fragmentation and packing information in the MAC PDU for the plurality of connection payloads based on a Fragmentation and Packing Indicator (FPI) bit map field present in the second header.

34. A first communication device, the device comprising:
a processor for encoding a first header of a MAC PDU to include connection payload information of a first connection payload from among a plurality of connection payloads, and for encoding a second header of the MAC PDU to include connection payload information of each of a second plurality of connection payloads from among the plurality of connection payloads, wherein the second plurality of connection payloads is a second set of connection payloads excluding the first connection payload; and
a transceiver for sending the MAC PDU including encoded information.

35. A second communication device, the device comprising:
a transceiver for receiving a MAC PDU including encoded information of a plurality of connection payloads; and
a processor for decoding a first header of the MAC PDU that includes connection payload information of a first connection payload from among the plurality of connection payloads, and for decoding a second header of the MAC PDU that includes connection payload information of each of a second plurality of connection payloads from among the plurality of connection payloads, wherein the second plurality of connection payloads is a second set of connection payloads excluding the first connection payload.

* * * * *